United States Patent [19]

Nagel et al.

[11] Patent Number: 5,301,620
[45] Date of Patent: Apr. 12, 1994

[54] REACTOR AND METHOD FOR DISASSOCIATING WASTE

[75] Inventors: Christopher J. Nagel, Wayland; Mark A. Wilkinson, Lexington; James E. Johnston, Waltham, all of Mass.

[73] Assignee: Molten Metal Technology, Inc., Waltham, Mass.

[21] Appl. No.: 41,490

[22] Filed: Apr. 1, 1993

[51] Int. Cl.⁵ .............................................. F23G 5/00
[52] U.S. Cl. ..................................... 110/346; 110/235; 110/250; 588/201; 423/DIG. 12
[58] Field of Search ............... 110/233, 235, 250, 346; 588/201, 205; 423/210.5, DIG. 12

[56] References Cited

U.S. PATENT DOCUMENTS

| | | | |
|---|---|---|---|
| 49,051 | 7/1865 | Bessemer . | |
| 331,267 | 11/1885 | Williamson . | |
| 876,437 | 1/1908 | Carson . | |
| 895,939 | 8/1908 | Baggaley . | |
| 2,002,010 | 5/1935 | Hilliard | 75/22.5 |
| 2,862,810 | 12/1958 | Alexandrovsky | 75/60 |
| 2,923,615 | 2/1960 | Pearce | 75/40 |
| 2,962,277 | 11/1960 | Morrill | 266/36 |
| 3,295,960 | 1/1967 | Parlee et al. | 75/93 |
| 3,486,882 | 12/1969 | Raguin et al. | 75/51 |
| 3,490,897 | 1/1970 | Dore et al. | 75/76 |
| 3,542,352 | 11/1970 | Themelis et al. | 266/36 |
| 3,632,335 | 1/1972 | Worner | 75/63 |
| 3,634,065 | 1/1972 | Worner | 75/46 |
| 3,839,019 | 10/1974 | Bruno et al. | 75/68 R |
| 3,985,549 | 10/1976 | Rheinländer et al. | 75/52 |
| 4,024,056 | 5/1977 | Yarwood et al. | 210/69 |
| 4,062,657 | 12/1977 | Knüppel et al. | 48/77 |
| 4,085,923 | 4/1978 | Queneau et al. | 266/215 |
| 4,175,731 | 11/1979 | Overdeck et al. | 266/142 |
| 4,235,627 | 11/1980 | Dantzig et al. | 75/93 E |
| 4,265,432 | 5/1981 | Lajovic et al. | 266/220 |
| 4,291,634 | 9/1981 | Bergsten et al. | 110/235 |
| 4,373,705 | 2/1983 | Yamada | 266/227 |
| 4,401,466 | 8/1983 | Wells et al. | 75/60 |
| 4,406,666 | 9/1983 | Paschen et al. | 48/92 |
| 4,457,777 | 7/1984 | MacGregor et al. | 75/51 |
| 4,540,432 | 9/1985 | Hirsch et al. | 75/43 |
| 4,574,714 | 3/1986 | Bach et al. | 110/346 |
| 4,602,574 | 7/1986 | Bach et al. | 110/346 |
| 4,627,601 | 12/1986 | Berthet et al. | 266/212 |
| 4,645,186 | 2/1987 | Hanniala | 266/212 |
| 4,790,516 | 12/1988 | Sugiura et al. | 266/144 |
| 4,798,532 | 1/1989 | Kimura et al. | 432/210 |
| 5,000,101 | 3/1991 | Wagner | 110/346 |
| 5,004,495 | 4/1991 | Labate | 75/10.22 |
| 5,015,288 | 5/1991 | Kusik et al. | 75/686 |
| 5,143,355 | 9/1992 | Iwamura et al. | 266/160 |
| 5,191,154 | 3/1993 | Nagel | 588/201 |
| 5,192,487 | 3/1993 | Malmström et al. | 266/201 |
| 5,194,081 | 3/1993 | Trevelyan et al. | 65/29 |

OTHER PUBLICATIONS

Howard K. Worner et al., "WORCRA (Continuous) Steelmaking", *Journal of Metals*, pp. 50-56 (Jun. 1969).

Primary Examiner—Edward G. Favors
Attorney, Agent, or Firm—Hamilton, Brook, Smith & Reynolds

[57] ABSTRACT

A reactor for dissociating waste in a molten metal bath includes a vertical reaction section for containing a molten metal bath and a horizontal separation section extending from an upper portion of the vertical reaction section. A waste is directed into the vertical section of the reactor. An oxidant is directed into the reactor for reaction with dissociation products of the waste to form gaseous, vitreous and molten metal reaction products in the molten metal bath. The horizontal separation section has discharge outlets for proximate and separate discharge of vitreous and molten metal product streams from the reactor at a location which is remote from the vertical reaction section. The vitreous and molten metal reaction products formed in the vertical reaction section flow from the vertical reaction section through the horizontal separation section to the discharge outlets, thereby promoting physical separation of the reaction products to form distinct gaseous, vitreous and molten metal product streams for separate discharge of the streams from the reactor.

17 Claims, 1 Drawing Sheet

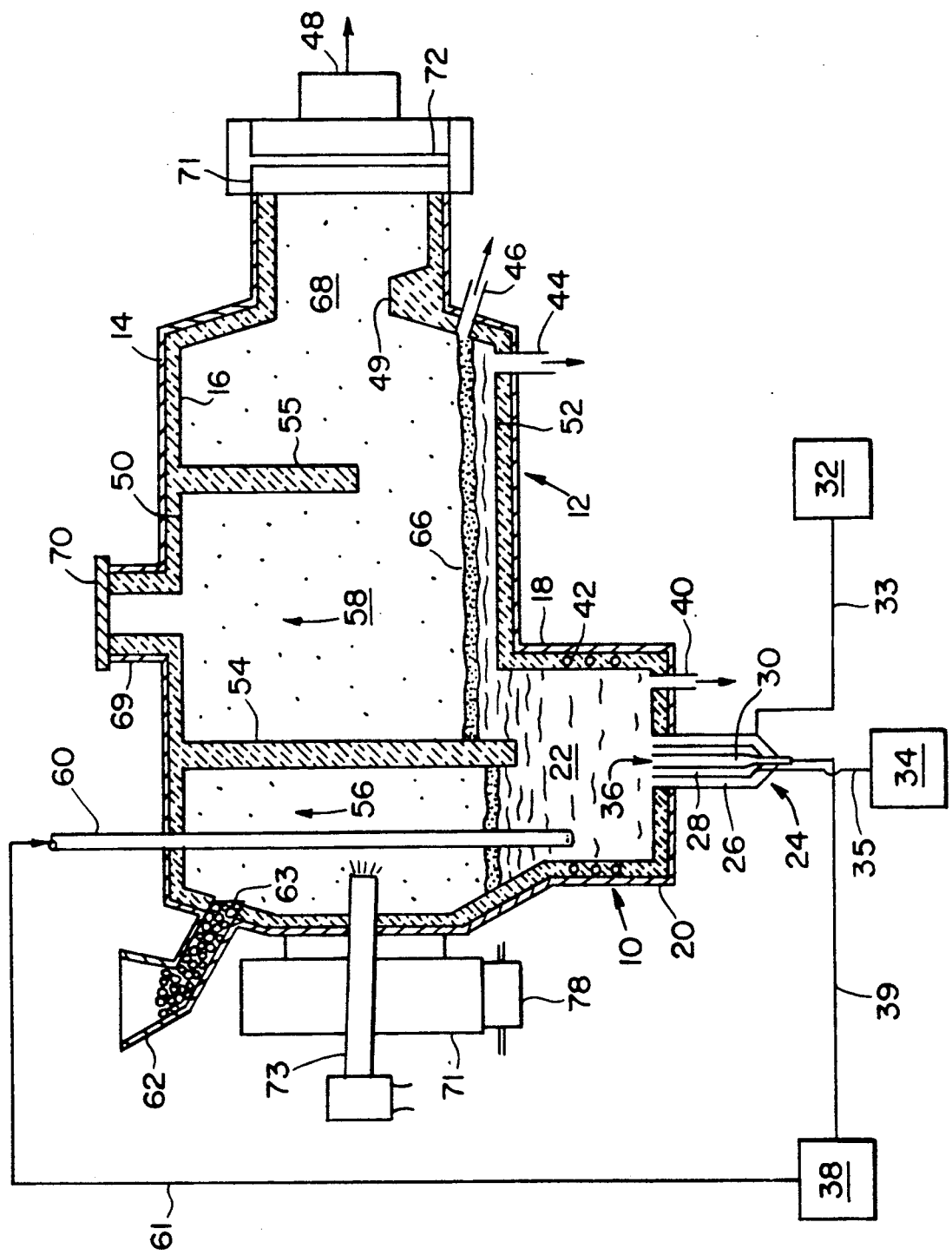

REACTOR AND METHOD FOR DISASSOCIATING WASTE

BACKGROUND OF THE INVENTION

Many types of hazardous wastes are generated every year. The wastes include organic materials, such as pesticides, polychlorinated biphenyls (PCBs), polybrominated biphenyls (PBBs), paints and solvents. Also, other wastes include inorganic material, such as the oxides of iron, zinc, aluminum, copper and magnesium and the salts of ferric chloride, ferrous chloride, aluminum chloride, etc.

Disposal of organic wastes in landfills and by incineration has become an increasingly difficult problem because of diminishing availability of disposal space, strengthened governmental regulations, and the growing public awareness of the impact of hazardous substance contamination upon the environment. Release of hazardous organic wastes to the environment can contaminate air and water supplies thereby diminishing the quality of life in the affected populations.

To minimize the environmental effects of the disposal of organic wastes, methods must be developed to convert these wastes into benign, and preferably, useful substances. In response to this need, there has been a substantial investment in the development of a variety of methods for treating hazardous organic wastes. One of the most promising new methods is described in U.S. Pat. Nos. 4,574,714 and 4,602,574, issued to Bach and Nagel. The method for destroying organic material, including toxic wastes, involves dissociation of the organic material to its atomic constituents in a molten metal and reformation of these atomic constituents into environmentally acceptable products, including hydrogen, carbon monoxide and/or carbon dioxide gases.

SUMMARY OF THE INVENTION

The present invention relates to a reactor and method for dissociating waste in a molten metal bath to form gaseous, vitreous and molten metal product streams from the waste.

The reactor is formed of materials which are refractory to the product streams. The reactor includes a vertical reaction section for containing a molten metal bath which can dissociate waste to form gaseous, vitreous and molten metal reaction products. Suitable means direct the waste into the vertical section of the reactor and directs an oxidant into the reactor for reaction with dissociation products of the waste to form the reaction products. A horizontal separation section is joined with an upper portion of the vertical reaction section. The horizontal separation section extends from the vertical reaction section and has discharge means for proximate and separate discharge of the vitreous and molten metal product streams from the reactor at a location which is remote from the vertical reaction section. The vitreous and molten metal reaction products formed in the vertical reaction section flow from the vertical reaction section through the horizontal separation section to the discharge means, thereby promoting physical separation of the reaction products to form distinct gaseous, vitreous and molten metal product streams for separate discharge of the streams from the reactor.

The method includes directing the waste into a reactor having a vertical reaction section for containing a molten metal bath which can dissociate waste to form gaseous, vitreous and molten metal reaction products. An oxidant is directed into the reactor for reaction with the waste to form the reaction products. The reaction products flow from the vertical reaction section, which is joined with an upper portion of the vertical reaction section, to the horizontal separation section, which extends from the vertical reaction section and has discharge means for proximate and separate discharge of the vitreous and molten metal product streams at a location which is remote from the vertical reaction section. Flow of the vitreous and molten metal reaction products from the vertical reaction section through the horizontal separation section to the discharge means promotes physical separation of the reaction products to form distinct gaseous, vitreous and molten metal product streams for separate discharge of the streams from the reactor.

This invention has the advantage, for example, of promoting separation of molten metal, vitreous and gaseous dissociation products of a waste injected into a molten metal bath. In addition, turbulent flow conditions of the molten metal bath in a vertical reaction section of the reactor cause more complete disassociation of the waste in the molten metal bath, thereby significantly reducing the amount of partially dissociated products released as gaseous components above the molten metal bath. A horizontal separation section reduces turbulence of the molten metal bath and causes substantially laminar flow of molten dissociation products through the horizontal separation section. The proximate and separate molten metal and vitreous product stream outlets at the horizontal separation section cause separate discharge of flowing molten metal, vitreous and gaseous streams, respectively, from the reactor.

BRIEF DESCRIPTION OF THE DRAWING

The Figure is a cut-away side elevational view of a reactor according to this invention.

DETAILED DESCRIPTION OF THE INVENTION

The features and other details of the apparatus and method of the invention will now be more particularly described with reference to the accompanying drawing and pointed out in the claims. It will be understood that the particular embodiments of the invention are shown by way of illustration and not as limitations of the invention. The principle features of this invention can be employed in various embodiments without departing from the scope of the invention.

The present invention relates generally to a reactor and a method for dissociating waste in a molten metal bath to form gaseous, vitreous and molten metal product streams from the waste. One embodiment of the reactor of the invention is illustrated in the Figure. The reactor includes vertical reaction section 10 and horizontal separation section 12. Vertical reaction section 10 includes upper portion 18 and lower portion 20. Horizontal separation section 12 is joined with and extends from upper portion 18 of vertical reaction section 10. The two sections can be joined unitarily, or they can be separate sections which are fastened together. Molten metal bath 22 is disposed in vertical section 10 of the reactor. Vertical reaction section 10 has a height and molten metal bath 22 has a volume which are sufficient to cause a substantial portion of the waste directed into molten metal bath 22 at vertical reaction section lower portion 20 of the vertical reaction section 10 to form molten vitreous and gaseous dissociation products in molten metal bath 22.

Suitable injection means, such as tuyere 24, which is a triple concentric tuyere, is disposed at lower portion 20 of vertical reaction section 10 for injecting the waste into the reactor. Tuyere 24 includes coolant inlet tube 26, oxidant inlet tube 28 and waste inlet tube 30.

Line 33 extends from coolant source 32 to coolant inlet tube 26. Coolant, such as a shroud gas, at coolant source 32, is suitable for cooling a region within lower portion 20 proximate to tuyere 24. Examples of suitable coolants include nitrogen gas ($N_2$), steam, methane ($CH_4$), chlorobenzene ($C_6H_5Cl$), etc. In one embodiment, chlorobenzene is converted to form hydrocarbon fragment radicals and chlorine radicals by exposure to molten metal bath 22.

Line 35 extends from oxidant source 34 to oxidant inlet tube 28. Oxidant inlet tube 28 is disposed within coolant tube 26. Suitable oxidants include oxygen, air, iron oxide, etc.

Line 39 extends from waste source 38 to waste inlet tube 30. Waste inlet tube 30 is disposed within oxidant inlet tube 28 at tuyere opening 36 to direct a suitable waste from waste source 38 and through tuyere opening 36 into the reactor. Examples of suitable wastes include organic chemicals, such as PBBs, PCBs, pesticides, solvents, paints, etc. Radioactive waste can also be processed.

Tuyere 24 is dimensioned and configured for introducing a waste, a coolant and an oxidant into the reactor. It is to be understood however that the waste and the oxidant can be introduced into the reactor conjointly and continuously, separately or intermittently. It is also to be understood that more than one tuyere 24 can be disposed in the reactor. For example, the waste can be introduced through a first concentric tuyere, not shown, and the oxidant can be separately introduced through a second concentric tuyere, also not shown, as an alternative to employing tuyere 24. Concentric tuyeres, such as for separate introduction of waste and oxidant, can be located proximately or remotely from each other in the reactor. Further, it is to be understood that the waste can be introduced into the reactor by other suitable methods, such as by employing a consumable lance, etc. In one embodiment, the waste and oxidant are introduced according to the method and system described in U.S. patent application Ser. No. 07/737,199, filed Jul. 29, 1991, which discloses the formation of oxides of dissolved atomic constituents in a molten metal bath. The teachings of U.S. patent application Ser. No. 07/737,199 are incorporated herein by reference.

Bottom tapping spout 40 extends from vertical reaction section lower portion 20 and is suitable for removal of at least a portion of molten metal bath 22 from the reactor. Additional drains can be provided as a means of continuously or intermittently removing distinct molten phases. Material also can be removed by other methods, such as are known in the art.

Induction coils 42 are disposed at vertical reaction section lower portion 20 for heating the reactor or for initiating generation of heat within the reactor. It is to be understood that, alternatively, the reactor can be heated by other suitable means, such as by oxyfuel burners, electric arc, etc.

Horizontal separation section 12 is substantially cylindrical in shape and has convex ends. Horizontal separation section 12 also includes molten stream outlet 44, vitreous stream outlet 46 and gaseous stream outlet 48 which are discharge means for proximate and separate discharge of the vitreous and molten metal product streams from the reactor. The outlets are at a location which is remote from vertical reaction section 10. Vitreous stream outlet 46 is elevated above molten stream outlet 44. Gaseous stream outlet 48 is disposed above vitreous stream outlet 46. Barrier 49 extends from vitreous stream outlet to a height which is sufficient to prevent vitreous and molten metal streams from flowing over barrier 49 into gaseous stream outlet 48.

Horizontal separation section 12 includes upper portion 50 and lower portion 52. Baffle 54 is disposed substantially vertically in the reactor and extends from upper portion 50 into vertical reaction section 10. Baffle 54 forms first chamber zone 56 and second chamber zone 58 within horizontal separation section 12. In one embodiment, baffle 54 is partially immersed in molten metal bath 22, thereby only allowing communication between first chamber zone 56 and second chamber zone 58 through molten metal bath 22.

Lance 60 extends from upper portion 50 into the molten metal bath 22. Lance 60 is suitable for injecting waste from waste source 38 through line 61 into molten metal bath 22 at vertical reaction section 10. Alternatively, waste can be directed through hopper 62 when baffle 54 extends into molten metal bath 22. Valve means 63 is disposed between hopper 62 and the reactor. Valve means 63 prevents gases that are formed by dissociation of waste in molten metal bath from escaping through hopper 62. In one embodiment, valve means 63 can be a double seal lock.

Second baffle 55 extends into second chamber zone 58 to baffle the gas flow of gaseous layer 68, which is disposed above vitreous layer 66. Often gas evolves with entrained particulates from vertical reaction section 10 to upper portion 50. After reaching upper portion 50, the evolved gas with the entrained solids is conducted toward gaseous stream outlet 48. Second baffle 55 directs the gas and entrained particulates downward to molten metal bath 22. At least a portion of the particulates impact molten metal bath 22 and vitreous layer 66 and are thereby separated from the gas, thereby reducing the amount of such particulates which escape from the reactor through gaseous stream outlet 48. The level of molten metal bath 22 in first chamber zone 56 can be lower than the level of molten metal bath 22 in second chamber zone 58 if first chamber zone 56 is sealed to prevent the exit of gaseous product, thereby allowing pressure to build up within first chamber zone 56. The gas pressure in the second chamber zone 58 is vented to gaseous outlet 48 usually at atmospheric pressure. This difference in pressure between first chamber zone 56 and second chamber zone 58 can cause the level of molten metal bath 48 to be lowered until gaseous product can pass under baffle 54 to second chamber zone 58.

Port 69 is at upper portion 50 of horizontal separation section 12 for introducing into the reactor a metal charge for molten metal bath 22. Hatch 70 seals port 69 during operation of the reactor. Oxyfuel lance 73 is disposed in the reactor for melting the metal charge. Trunions 71 are disposed at the reactor for manipulation of the reactor, such as by rotation. Seal 72 is disposed at gaseous stream outlet 48 and is suitable for allowing partial rotation of the reactor about trunions 71 by rotation means 78 without breaking seal 72. Rotation means 78 can be a roller which is in contact with trunion 71 thereby causing the reactor to partially rotate when rotation means 78 is activated.

In one embodiment, the reactor has an operating capacity of about ten tons of molten iron metal at about 1,600° C. Vertical reaction section 10 is between about 0.5 feet and 4 feet in height and has a diameter of between about one and four feet. Horizontal separation section 12 is between about five feet and twenty feet in length and has a diameter of between about five and ten feet. The reactor is constructed of a material suitable for containing molten metal and withstanding the operating conditions of the reactor, which includes metal shell 14 and refractory lining 16 within metal shell 14. An example of a suitable material of construction for metal shell 14 is a metal alloy, such as a SA516 Grade 70 steel. The interior of the reactor is lined with a material which is refractory to molten metal bath and the products formed in the reactor. An example of a refractory material is a ceramic, such as alumina or a mixture of ninety percent alumina, by weight, and ten percent titanium oxide. The refractory material is typically in the form of bricks.

In one embodiment, molten metal bath 22 includes a metal having a free energy of oxidation, at the operating conditions the reactor, which is greater than that of the conversion of atomic carbon to carbon monoxide. In one example, molten metal bath 22 includes carbon in an amount in the range of between about 0.5% and about 6%, by weight.

Examples of suitable metals in molten metal bath 22 include iron, chromium, manganese, copper, nickel, cobalt, etc. It is to be understood that molten metal bath 22 can include more than one metal. For example, molten metal bath 22 can include a solution of metals. Also it is to be understood that molten metal bath 22 can include oxides of the molten metals. As disclosed in U.S. Pat. No. 5,177,304, the teachings of which are incorporated by reference, molten metal bath 22 can include more than one phase of molten metal. In one embodiment, molten metal bath 22 is formed of a vitreous phase which includes at least one metal oxide and does not include a molten metal phase. In another embodiment, the vitreous phase can include at least one salt.

Molten metal bath 22 can be formed by partially filling the reactor through port 69 with a suitable metal, such as solid scrap metal. Suitable metal can also be introduced into reactor through lance 60 from a metal source, not shown, or through hopper 62 and valve means 63. Port 69 is sealed by hatch 70. Induction coils 42 are activated for initiating generation of heat to melt the metal and form molten metal bath 22. Alternatively, the reactor is then tilted by rotation means 78 about ninety degrees until tuyere 24 is elevated above the fluid level of the metal charge upon melting of the charge. The metal charge is then melted by means of oxyfuel lance 73 or a plasma torch which is disposed within horizontal separation section 12 and above the metal charge. During melting, tuyere 24 is purged with an inert gas to prevent any possible plugging of tuyere 24 with metal. Tuyere 24 is activated by directing the waste or oxidant, and the coolant, through tuyere 24 into the reactor. The reactor is then returned to an upright position, thereby immersing tuyere 24 without being damaged. Rotation of the reactor, as described herein, allows the metal to become molten while minimizing damage to tuyere 24 and the refractory lining.

Molten metal bath 22 fills vertical reaction section 10 and a portion of horizontal separation section 12. Where two immiscible metals are introduced into the reactor, the metals separate during melting to form a first molten phase and a second molten phase. In one embodiment, the viscosity of at least one phase of molten metal bath 22 is less than about ten centipoise at the operating conditions of the reactor.

Suitable operating conditions of the reactor include a temperature of molten metal bath 22 which is sufficient to chemically react waste from waste source 38 and thereby form molten metal, vitreous and gaseous products in molten metal bath 22.

Vitreous layer 66 is formed on molten metal bath 22. Vitreous layer 66 is substantially immiscible with molten metal bath 22. Vitreous layer 66 can include at least one metal oxide, the metal element of which has free energy of oxidation, at operating conditions of the reactor, less than the free energy of oxidation of atomic carbon to carbon monoxide. Vitreous layer 66 typically has a lower thermal conductivity than that of molten metal bath 22. Radiant loss of heat from molten metal bath 22 can thereby be reduced significantly below the radiant heat loss from molten metal bath 22 when no vitreous layer is present. In one embodiment, vitreous layer 66 contains about 40% calcium oxide, about 40% silicon dioxide and about 20% aluminum oxide and is about five inches thick.

Examples of suitable metal oxides of vitreous layer 66 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of vitreous layer 66 include halogens, sulphur, phosphorus, heavy metals, etc. It is to be understood that vitreous layer 66 can include more than one metal oxide. Vitreous layer 66 can contain more than one phase. Typically, vitreous layer 66 is substantially fluid thereby allowing free of radicals and other gases to pass through vitreous layer 66 from molten metal bath 22. Vitreous layer 66 can be formed from suitable materials, such as metals, metal oxides, halogens, sulphur, phosphorus, heavy metals, sludges, etc. Organic components of waste, such as oil or coal, can also be included in vitreous layer 66.

Waste is directed from waste source 38 through lance 60 into molten metal bath 22 or injected through tuyere 24 into molten metal bath 22 at vertical reaction section lower portion 20 of vertical reaction section 10 or both. Alternatively, portions of the waste can be directed through hopper 62 as whole articles, such as paper products, tires, coal, etc. The waste can form other stable compounds, such as, for example, alkali metal cations or alkaline earth metal cations, at the operating conditions of the reactor. Examples of such stable reaction products include calcium fluoride ($CaF_2$) and magnesium phosphate ($Mg_3(PO_4)_2$).

The waste is suitable for chemical dissociation in molten metal bath 22 to form molten metal, vitreous and gaseous products in molten metal bath 22. Typically, gaseous dissociation products will also be formed from the waste in molten metal bath 22. The waste can be in gas, liquid or solid form, or a combination thereof. Generally, the waste includes organic compounds, such as alkanes, alkenes, etc. It is also to be understood that inorganic compositions can also be used as feed for introduction and chemical reaction in the reactor. Suitable examples of inorganic waste include, but are not limited to, metals and their oxides, sulfides and halides.

In addition to carbon, waste can include other atomic constituents, such as hydrogen, etc.

The waste directed into vertical reaction section 10 of the reactor combines with molten metal bath 22. On contact with molten metal bath 22 in lower portion 20, the waste dissociates to form at least vitreous components. Also, molten metal and gaseous components can be formed in molten metal bath 22. Oxidant is directed into lower portion 20 of molten metal bath 22 by injection means conjointly and continuously, separately or intermittently with the waste. Oxidant is injected with waste to oxidize at least a portion of the waste to form vitreous and, possibly, gaseous products. Examples of oxidized products include carbon monoxide, carbon dioxide, metal oxides, etc. It is to be understood, the molten metal product stream can include formed products or, alternatively, can be just a portion of molten metal bath 22.

In one embodiment, a portion of molten metal bath 22 in vertical reaction section 10 is turbulent. The portion of molten metal bath 22 in horizontal separation section 12 is not as turbulent as the portion in vertical reaction section 10. The flow of molten and vitreous streams in horizontal separation section 12 is substantially laminar near molten stream outlet 44 and vitreous stream outlet 46.

The formed molten, vitreous and gaseous dissociation products flow from vertical reaction section 10 to horizontal separation section 12 to discharge means, thereby promoting the physical separation of the dissociation products into distinct molten, vitreous and gaseous product streams in horizontal separation section 12 for proximate and separate removal of the streams from the reactor. The molten metal, vitreous and gaseous streams exit through molten stream outlet 44, vitreous stream outlet 46 and gaseous stream outlet 48, respectively.

As the molten, vitreous and gaseous reaction products form from the waste, portions of molten and vitreous products in horizontal separation section 12 are drawn off through molten stream outlet 44 and vitreous stream outlet 46, thereby allowing portions of molten and vitreous reaction products to be drawn from vertical reaction section 10 into horizontal separation section 12. As the reaction products are drawn from vertical reaction section 10 to horizontal separation section 12, the flow of the products become less turbulent. In one embodiment, the flow of molten reaction products in horizontal separation section 12 is substantially laminar. Diminished turbulence, or laminar flow of the products, allows partial separation of the molten and vitreous reaction products to form molten and vitreous product streams, respectively. A gaseous product stream forms above vitreous layer 66 which, in horizontal separation section 12, is the vitreous product stream. The molten, vitreous and gaseous product streams flow in horizontal separation section 12 toward molten, vitreous and gaseous stream outlets 44,46,48, respectively. Concurrent flow of the molten and vitreous product streams through horizontal separation section 12 promotes the physical separation of molten and vitreous components of molten metal bath 22 generated by dissociation and, possibly, oxidation of the waste and intermediate dissociation products in molten metal bath 22.

Molten metal in molten metal bath 22 is removed through molten stream outlet 44. The upper level of molten metal within the reactor is controlled at least partially by draining the molten stream from the reactor through molten stream outlet 44. Molten metal in the reactor is maintained at a level whereby only molten metal bath 22 is separately discharged through molten stream outlet 44, but not allowed to exit the reactor through either vitreous stream outlet 46 or gaseous stream outlet 48.

Vitreous layer 66 is removed through vitreous stream outlet 46. The upper level of vitreous layer 66 within the reactor is controlled at least partially by draining molten metal from the reactor and by draining vitreous layer 66 from horizontal separation section 12 through vitreous stream outlet 46. The levels of molten metal bath 22 and vitreous layer 66 are sufficient to cause the vitreous stream to be separately discharged from the reactor through vitreous stream outlet 48.

Gaseous layer 68 is formed at least partially from dissociation products of the waste in molten metal bath 22 and collects over vitreous layer 66. In one embodiment, gaseous layer 68 extends from upper portion 50 of horizontal separation section 12 to gaseous stream outlet 48. The gas formed from the waste migrates from molten metal bath 22 to gaseous layer 68 and is separately discharged from the reactor through gaseous stream outlet 48. At gaseous stream outlet 48, at least one component of the off-gas is collected by a suitable means, such as a scrubber, condenser or other suitable apparatus.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A reactor for dissociating waste in a molten metal bath and for forming gaseous, vitreous and molten metal product streams from said waste, the reactor being formed of materials which are refractory to the product streams and comprising:
   a) a vertical reaction section for containing a molten metal bath which can dissociate waste to form gaseous, vitreous and molten metal reaction products;
   b) means for directing the waste into the vertical section of the reactor;
   c) means for directing an oxidant into the reactor for reaction with dissociation products of the waste to form said reaction products; and
   d) a horizontal separation section which is joined with an upper portion of said vertical reaction section, said horizontal separation section extending from the vertical reaction section and having discharge means for proximate and separate discharge of the gaseous, vitreous and molten metal product streams from the reactor at a location which is remote from said vertical reaction section, whereby the vitreous and molten metal reaction products formed in the vertical reaction section flow from said vertical reaction section through the horizontal separation section to the discharge means, thereby promoting physical separation of said reaction products to form distinct gaseous, vitreous and molten metal product streams for separate discharge of said streams from the reactor.

2. A reactor of claim 1 wherein the discharge means includes a molten metal stream outlet and a vitreous stream outlet, whereby the molten metal and vitreous reaction products flow through the horizontal separation section to cause said reaction products to form molten metal and vitreous product streams in the horizontal separation section for proximate and separate discharge of said streams from the reactor through the molten metal and vitreous stream outlets, respectively.

3. A reactor of claim 2 wherein the discharge means further includes a gaseous stream outlet which is proximate to the molten metal stream outlet and the vitreous stream outlet, whereby the gaseous product flows through the horizontal separation section to form a gaseous product stream for separate discharge of the gaseous product stream from the reactor through the gaseous stream outlet.

4. A reactor of claim 3 further including at least one first baffle which is disposed within the reactor and extends from the horizontal separation section into the molten metal bath in the vertical reaction section, the baffle and the reactor defining a first horizontal separation chamber and a second horizontal separation chamber.

5. A reactor of claim 4 further including a lance for charging solids into the reactor and which extends from the first horizontal separation chamber into the vertical reaction section.

6. A reactor of claim 5 further including at least one second baffle which is disposed within the second horizontal separation chamber and above the molten metal bath for baffling flow of the gaseous product stream prior to discharge of the gaseous product stream from the reactor through the gaseous stream outlet.

7. A reactor of claim 6 wherein the means for directing the waste into the reactor includes at least one tuyere disposed at a lower portion of the vertical reaction section.

8. A reactor of claim 7 wherein the tuyere is a multiple concentric tuyere.

9. A reactor of claim 8 wherein the tuyere is substantially vertical.

10. A reactor of claim 8 wherein the tuyere is substantially horizontal.

11. A reactor of claim 8 further including means disposed at the reactor for rotating the reactor in an amount sufficient to elevate the tuyere above a molten metal bath within the reactor.

12. A reactor for dissociating waste in a molten metal bath for forming vitreous and molten metal product streams from said waste, the reactor being formed of materials which are refractory to the product streams and comprising:
 a) a vertical reaction section for containing a molten metal bath which can dissociate waste to form vitreous and molten metal reaction products;
 b) means for directing the waste into the vertical section of reactor;
 c) means for directing an oxidant into the reactor for reaction with dissociation products of the waste to form said reaction products; and
 d) a horizontal separation section which is joined with an upper portion of said vertical reaction section, said horizontal separation section extending from the vertical reaction section and having discharge means for proximate and separate discharge of the vitreous and molten metal product streams from the reactor at a location which is remote from said vertical reaction section, whereby the vitreous and molten metal reaction products formed in the vertical reaction section flow from said vertical reaction section through the horizontal separation section to the discharge means, thereby promoting physical separation of said reaction products to form distinct vitreous and molten metal product streams for separate discharge of said streams from the reactor.

13. A method for dissociating waste in a molten metal bath for forming gaseous, vitreous and molten metal product streams from said waste, comprising the steps of:
 a) directing the waste into a reactor having a vertical reaction section for containing a molten metal bath which can dissociate waste to form gaseous, vitreous and molten metal reaction products; and
 b) directing an oxidant into the reactor for reaction with dissociation products of the waste to form said reaction products, said reaction products flowing from said vertical reaction section through a horizontal separation section which is joined with an upper portion of said vertical reaction section, said horizontal separation section extending from the vertical reaction section and having discharge means for proximate and separate discharge of the gaseous, vitreous and molten metal product streams at a location which is remote from said vertical reaction section, whereby flow of the reaction products from said vertical reaction section through the horizontal separation section to the discharge means promotes physical separation of said reaction products to form distinct gaseous, vitreous and molten metal product streams which are separately discharged from the reactor.

14. A method of claim 13 wherein the waste is directed into the reactor at a rate which causes flow of the molten metal bath in the vertical reaction section to be turbulent and wherein flow in a substantial portion of the horizontal separation section is laminar.

15. A method of claim 13 wherein the waste is directed into the molten metal bath in said vertical section.

16. A method of claim 14 wherein the waste includes at least one component which forms a vitreous reaction product that includes a metal oxide.

17. A method of claim 16 wherein the waste is directed into a molten metal bath that includes iron and copper.

* * * * *